United States Patent
Keopuang et al.

(10) Patent No.: US 8,322,235 B1
(45) Date of Patent: Dec. 4, 2012

(54) MICROACTUATOR TEST ASSEMBLY COMPRISING A SPREADER PIN FOR ENGAGING A LOAD BEAM OF AN ACTUATOR ARM

(75) Inventors: Witthaya Keopuang, Klong Luang (TH); Siwaphon Sonkham, Klong Luang (TH); Sanya Thamprasit, Bangpa-In (TH)

(73) Assignee: Western Digital Technologies, Inc., Irvine, CA (US)

( * ) Notice: Subject to any disclaimer, the term of this patent is extended or adjusted under 35 U.S.C. 154(b) by 79 days.

(21) Appl. No.: 13/030,617

(22) Filed: Feb. 18, 2011

(51) Int. Cl.
*G01N 19/00* (2006.01)
(52) U.S. Cl. ...................................... 73/865.9
(58) Field of Classification Search .......... None
See application file for complete search history.

(56) References Cited

U.S. PATENT DOCUMENTS

| | | | |
|---|---|---|---|
| 2,728,222 A * | 12/1955 | Becker et al. ............ | 73/105 |
| 4,760,358 A | 7/1988 | Inoue | |
| 5,118,982 A | 6/1992 | Inoue et al. | |
| 5,262,643 A * | 11/1993 | Hammond et al. ........ | 850/3 |
| 5,301,558 A | 4/1994 | Livingston et al. | |
| RE37,030 E * | 1/2001 | Lloyd et al. ............ | 33/559 |
| 6,249,890 B1 | 6/2001 | Ukani et al. | |
| 6,510,752 B1 | 1/2003 | Sacks et al. | |
| 6,556,028 B1 | 4/2003 | Umanskiy et al. | |
| 6,639,411 B1 | 10/2003 | Thomsen | |
| 6,831,807 B2 | 12/2004 | Koso et al. | |
| 6,861,854 B1 | 3/2005 | Guo et al. | |
| 6,870,377 B2 | 3/2005 | Thomsen | |
| 6,975,477 B1 | 12/2005 | Hu et al. | |
| 6,977,793 B2 | 12/2005 | White et al. | |
| 7,009,804 B2 | 3/2006 | Sharma et al. | |
| 7,072,134 B1 | 7/2006 | Hirano et al. | |
| 7,075,748 B2 | 7/2006 | White et al. | |
| 7,079,338 B1 | 7/2006 | Semba et al. | |
| 7,079,339 B1 | 7/2006 | Semba et al. | |
| 7,106,552 B2 | 9/2006 | Hirano et al. | |
| 7,124,654 B1 | 10/2006 | Davies et al. | |
| 7,336,434 B2 | 2/2008 | Lille et al. | |
| 7,423,837 B2 | 9/2008 | Hutsell | |
| 7,768,276 B2 | 8/2010 | Yao | |
| 2003/0076121 A1 * | 4/2003 | Guo et al. ............... | 324/727 |
| 2009/0303839 A1 | 12/2009 | Narayanan et al. | |
| 2010/0037674 A1 * | 2/2010 | Yashchuk et al. ........ | 73/1.89 |

FOREIGN PATENT DOCUMENTS

| | | |
|---|---|---|
| UA | 20940 | 2/2007 |
| UA | 20943 | 2/2007 |
| WO | WO2009128546 | 10/2009 |

* cited by examiner

*Primary Examiner* — Robert R Raevis

(57) ABSTRACT

A microactuator test assembly is disclosed for testing a microactuator mounted at a joint coupling a base end of a load beam to a distal end of an actuator arm. A spreader pin deflects the load beam by moving from a first position to a second position, and a signal detector measures a sensor signal generated by the microactuator while deflecting the load beam with the spreader pin.

28 Claims, 6 Drawing Sheets

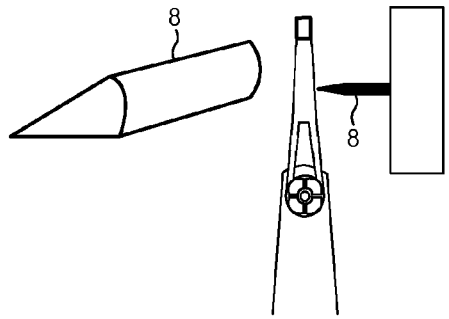
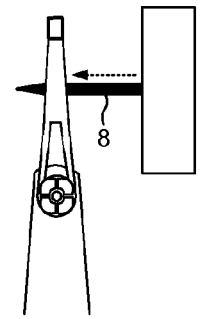
FIG. 2A  FIG. 2B
FIG. 2C  FIG. 2D
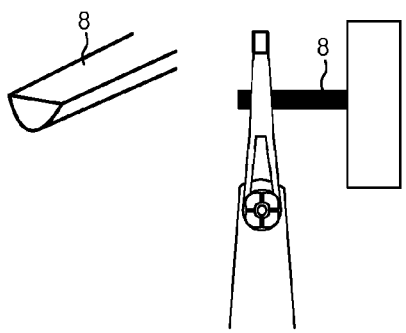
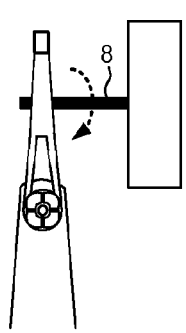
FIG. 3A  FIG. 3B
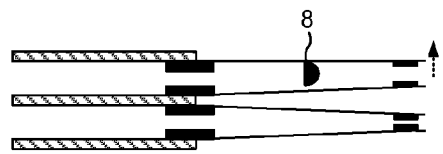
FIG. 3C  FIG. 3D

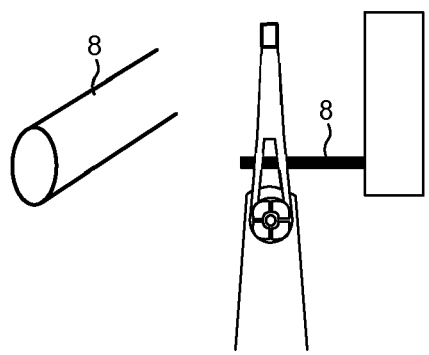
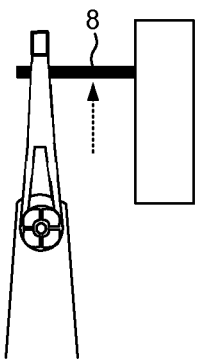
FIG. 4A　　　　　　FIG. 4B
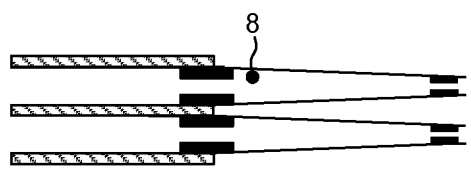
FIG. 4C　　　　　　FIG. 4D
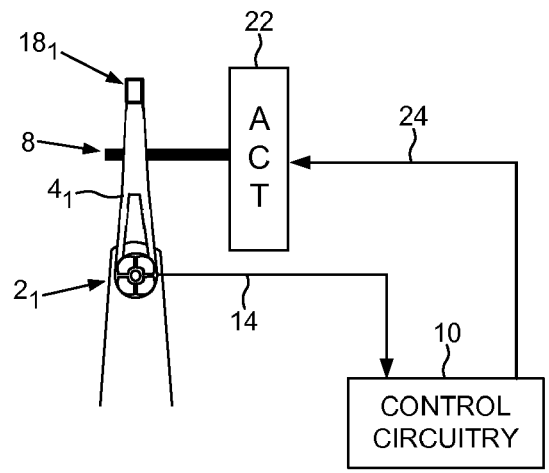
FIG. 6

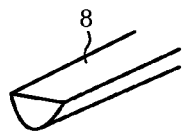 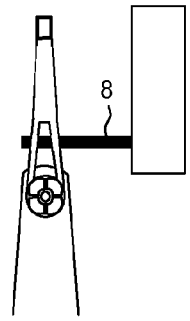 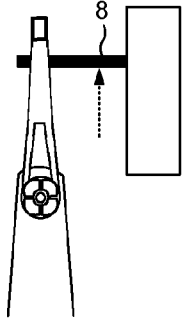 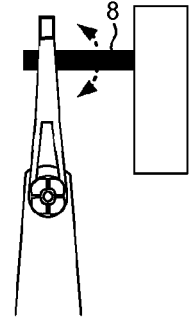
FIG. 5A  FIG. 5B  FIG. 5C
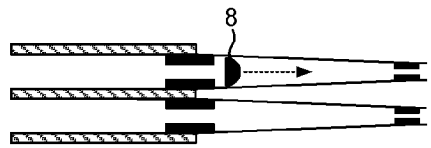 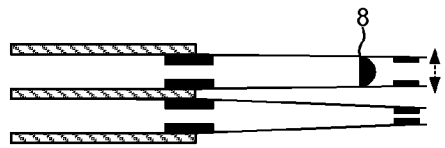
FIG. 5D  FIG. 5E
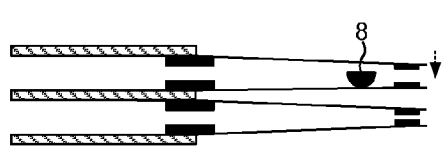 
FIG. 5F  FIG. 5G
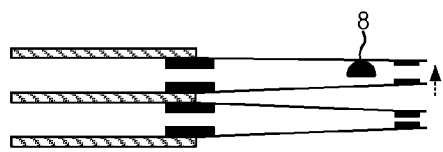 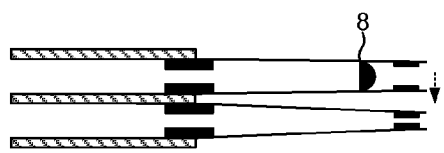
FIG. 5H  FIG. 5I

MICROACTUATOR TEST ASSEMBLY COMPRISING A SPREADER PIN FOR ENGAGING A LOAD BEAM OF AN ACTUATOR ARM

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

As the density of the data tracks increases, a microactuator may be employed in combination with the VCM to improve the tracking performance of the servo system.

Any suitable microactuator may be employed such as a suitable piezoelectric (PZT) actuator. It may be desirable to test the microactuators before being installed into a disk drive so that defective microactuators can be replaced or disabled.

BRIEF DESCRIPTION OF THE DRAWINGS

FIGS. 2A-2D show an embodiment of the present invention wherein the spreader pin comprises a tapered surface that engages the load beam in order to deflect the load beam.

FIGS. 3A-3D show an embodiment of the present invention wherein the spreader pin comprises a D-shape that is rotated about an axis in order to deflect the load beam.

FIGS. 4A-4D show an embodiment of the present invention wherein the spreader pin is slid from a base end of the load beam toward a distal end in order to deflect the load beam.

FIGS. 5A-5I show an embodiment of the present invention wherein the spreader pin is slid from a base end of top/bottom load beams toward a distal end, and then rotated in order to deflect one of the top/bottom load beams.

FIG. 6 shows an embodiment of the present invention wherein control circuitry controls an actuator to move the spreader pin as well as measures the sensor signal.

DETAILED DESCRIPTION OF EMBODIMENTS OF THE INVENTION

Figure 1A:
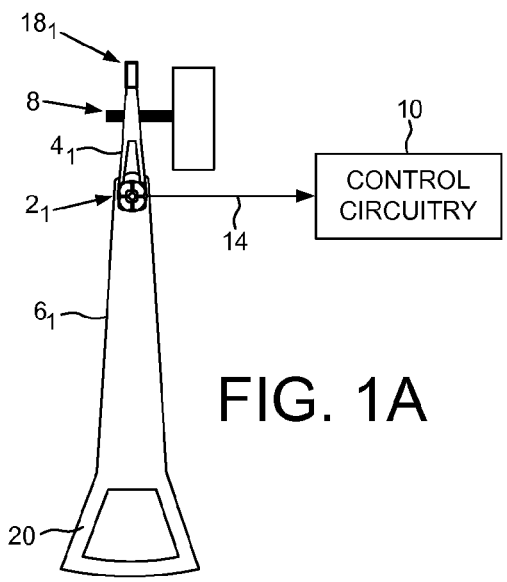
FIG. 1A shows a microactuator test assembly for testing a microactuator mounted at a joint coupling a base end of a load beam to a distal end of an actuator arm.
Figure 1B:
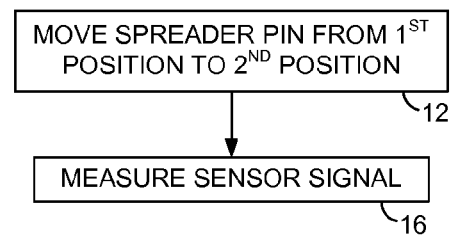
FIG. 1B is a flow diagram according to an embodiment of the present invention wherein a sensor signal generated by the microactuator is measured while deflecting the load beam with a spreader pin in order to determine whether the microactuator is defective.

FIG. 1A shows a microactuator test assembly according to an embodiment of the present invention for testing a microactuator $2_1$ mounted at a joint coupling a base end of a load beam $4_1$ to a distal end of an actuator arm $6_1$. The microactuator test assembly comprises a spreader pin 8 and control circuitry 10 including a signal detector. FIG. 1B shows a flow diagram according to an embodiment of the invention wherein the spreader pin 8 deflects the load beam by moving from a first position to a second position (step 12), and the signal detector measures a sensor signal 14 generated by the microactuator $2_1$ while deflecting the load beam $4_1$ with the spreader pin 8 (step 16).

Figure 1C:
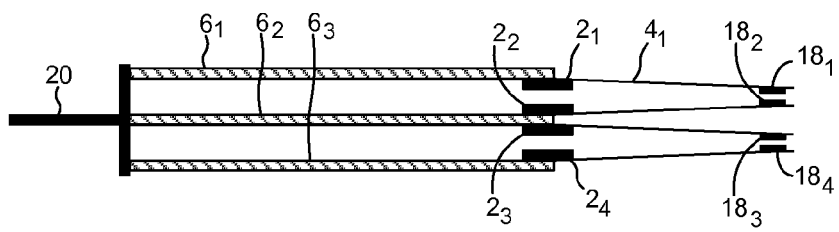
FIG. 1C shows an embodiment wherein an actuator arm assembly comprises multiple actuator arms for actuating heads over respective disk surfaces of a disk drive, wherein each load beam of the actuator arm assembly is deflected using a spreader pin in order to test the respective microactuators.

In the embodiment of FIG. 1A, components of a disk drive are shown including a head $18_1$ coupled to a distal end of the load beam $4_1$, and a voice coil 20 coupled to a base of the actuator arm $6_1$ and operable to rotate the actuator arm $6_1$ about a pivot in order to actuate the head $18_1$ radially over a disk surface (not shown). In one embodiment, the voice coil 20 provides coarse positioning of the head over the disk surface, and the microactuator $2_1$ provides fine positioning of the head over the disk surface. In an embodiment shown in FIG. 1C, the disk drive may comprise multiple disks (multiple disk surfaces) and a corresponding head $18_1$-$18_4$ actuated over each disk surface by a respective microactuator $2_1$-$2_4$. In one embodiment, the actuator arms $6_1$-$6_3$ may be coupled into an E-block assembly for installation into a multi-disk disk drive, wherein the microactuators $2_1$-$2_4$ are tested prior to installing the E-block assembly into the disk drive. In an alternative embodiment, the microactuators may be tested by the microactuator test assembly prior to coupling the actuator arms into an E-block assembly.

Any suitable spreader pin 8 may be employed in the embodiments of the present invention, as well as any suitable technique for moving the spread pin from the first position to the second position in order to deflect the load beam. FIG. 2A shows an embodiment wherein the spreader pin 8 comprises a tapered surface at a distal end, and in the embodiment of FIG. 2A, the tapered surface comprises a tapered point. The load beam engages the tapered point of the spread pin 8, for example by moving the spreader pin 8 toward the load beam as illustrated in FIG. 2B, or alternatively by moving the load beam toward the spreader pin 8. The first position corresponds to when the load beam first engages the tapered surface of the spreader pin 8, and the second position corresponds to the load beam sliding along the spreader pin 8 a predetermined distance. FIG. 2C illustrates the spreader pin 8 first engaging the load beam, and FIG. 2D shows the spreader pin 8 after moving into the second position, thereby deflecting the load beam in an upward direction as illustrated in FIG. 2D.

FIG. 3A shows an embodiment wherein the spreader pin 8 comprises a D-shaped pin that is rotated about an axis in order to deflect the load beam as illustrated in FIG. 3B. The spreader pin 8 may be moved into an initial position under the load beam, or the load beam may be moved over the spreader pin 8. The first position corresponds to a first angle of rotation as illustrated in FIG. 3C, and the second position corresponds to a second angle of rotation as illustrated in FIG. 3D wherein the spreader pin 8 has been rotated in order to deflect the load beam in an upward direction.

FIG. 4A shows an embodiment wherein the spreader pin 8 comprises a cylinder shaped pin that is slid along a plane parallel with the load beam in order to deflect the load beam. The spreader pin 8 may be moved into an initial position under the load beam, or the load beam may be moved over the spreader pin 8. The spreader pin 8 is first positioned toward a base end of the load beam as illustrated in FIGS. 4A and 4C, and then moved along the plan parallel to the load beam to a second position toward a distal end of the load beam in order to deflect the load beam in an upward direction as illustrated in FIG. 4D.

FIGS. 5A-5I illustrate an embodiment of the present invention wherein the spreader pin 8 comprises a D-shaped pin that initially deflects top/bottom load beams and is then rotated in order to deflect one of the top/bottom load beams. Referring to FIGS. 5A and 5D, the spreader pin 8 is initially positioned between the top/bottom load beams near a base end of the load beams. The spreader pin 8 is then slid along a plane parallel with the load beams in order to deflect the top/bottom load beams as shown in FIGS. 5B and 5E. One of the top/bottom load beams is then deflected by rotating the spreader pin 8 as shown in FIG. 5C. For example, the spreader pin 8 may be rotated in a clockwise direction as shown in FIG. 5F in order to deflect the top load beam downward. The spreader pin 8 may then be rotated in a counterclockwise direction as shown in FIG. 5G in order to deflect the top load beam upward. To deflect the bottom load beam upward, the spreader pin may be rotated starting in the position of FIG. 5E in a counterclockwise direction as shown in FIG. 5H, and then to deflect the bottom load beam downward the spreader pin may be rotated in a clockwise direction as shown in FIG. 5I.

In one embodiment, the microactuator test assembly comprises a single spreader pin 8 that may be positioned relative to the load beams. In the examples described above, the spreader pin 8 may move in a plane perpendicular to the load beams in order to position the spreader pin 8 relative to the load beams. In another embodiment, the microactuator test assembly may comprise a number of spreader pins corresponding to the number of load beams being tested, wherein one of the spreader pins may be actuated in order to deflect a corresponding load beam. In yet another embodiment, the microactuator test assembly may comprise a single spreader pin for each of top and bottom load beams (two spreader pins in the above described embodiments), wherein each spreader pin may move in a plane perpendicular to the load beams so that the spreader pin may be positioned to deflect a selected one of the top or bottom load beams.

Any suitable microactuator may be employed in the embodiments of the present invention, such as a suitable piezoelectric (PZT) actuator which deforms when excited by an electrical signal (e.g., current or voltage). Conversely, the microactuator will generate an electrical sensor signal when deflected by the spreader pin, wherein the characteristics of the sensor signal indicate whether the microactuator is defective. Accordingly, in the embodiments of the present invention the control circuitry 10 comprises a suitable signal detector (e.g., amplifier) for measuring the sensor signal as the load beam is deflected by the spreader pin.

In one embodiment, the spreader pin may be manually actuated by an operator of the microactuator test assembly in order to cause the spreader pin to deflect the load beam. For example, the operator may grasp a suitable feature such as a tab extending from the spreader pin and slide the spreader pin along a suitable slot or rotate the spreader pin depending on the embodiment. FIG. 6 shows an alternative embodiment of the present invention wherein the microactuator test assembly comprises an actuator 22 for actuating the spreader pin in order to deflect the load beam, for example, by moving the spread pin as illustrated in FIGS. 2A-2D and 4A-4D, or rotating the spreader pin as illustrated in FIGS. 3A-3D and FIGS. 5A-5I. The control circuitry 10 generates a suitable control signal 24 for controlling the actuator 22 to deflect the load beam, and then measures the sensor signal 14 emanating from the microactuator $2_1$.

Figure 7A:
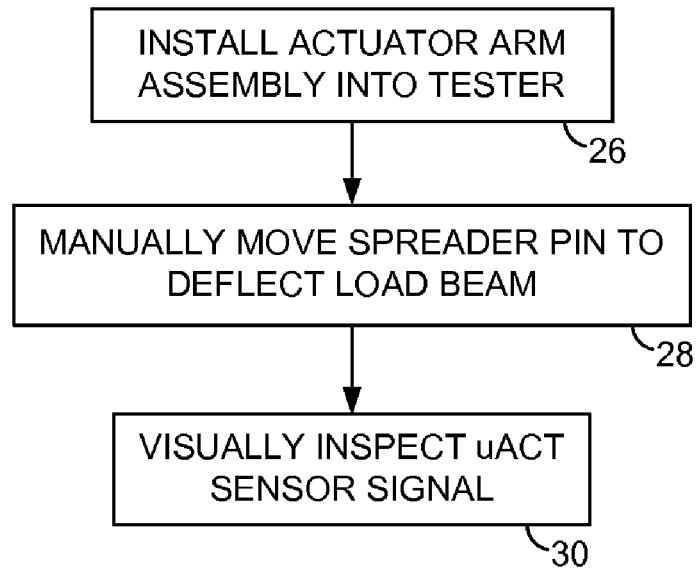
FIG. 7A is a flow diagram according to an embodiment of the present invention wherein an operator of the microactuator test assembly manually moves the spreader pin and visually evaluates the sensor signal to determine whether the microactuator is defective.

FIG. 7A is a flow diagram according to an embodiment of the present invention wherein after installing an actuator arm assembly into the microactuator test system (step 26), an operator manually moves the spreader pin to deflect the load beam (step 28), for example, by sliding the load beam or by rotating the load beam as described above. The sensor signal generated by the microactuator while deflecting the load beam is displayed on a monitor so that it can be evaluated by the operator to determine whether the microactuator is defective (step 30).

Figure 7B:
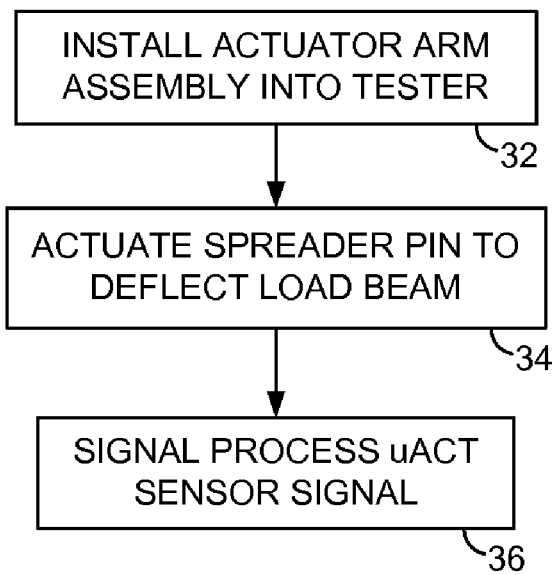
FIG. 7B is a flow diagram according to an embodiment of the present invention wherein an actuator moves the spreader pin and a signal processor evaluates the sensor signal to determine whether the microactuator is defective.

FIG. 7B is a flow diagram according to an embodiment of the present invention wherein after installing an actuator arm assembly into the microactuator test system (step 32), the control circuitry actuates the spreader pin to deflect the load beam (step 34), for example, by sliding the load beam or rotating the load beam as described above. The sensor signal generated by the microactuator while deflecting the load beam is evaluated by a signal processor to determine whether the microactuator is defective (step 36).

Figure 8:
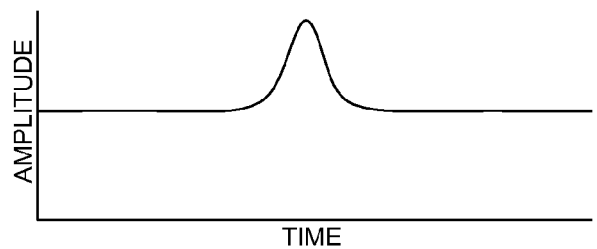
FIG. 8 shows an embodiment wherein the sensor signal comprises a single pulse due to deflecting the load beam.

The sensor signal generated by the microactuator while deflecting the load beam may take on any suitable characteristics. In one embodiment, the microactuator has no DC response and therefore the sensor signal appears as a pulse shown in FIG. 8 as the load beam is deflected (e.g., upward) by the spreader pin. The single pulse sensor signal may be compared to a nominal pulse signal in order to determine whether the microactuator is defective. In another embodiment illustrated in FIG. 9A, the sensor signal may comprise a first pulse as the spreader pin moves from the first to second position in order to deflect the load beam in a first direction (e.g., upward), and a second pulse as the spread pin is moved from the second position back to the first position thereby allowing the load beam to move (e.g., downward) back to it's original orientation.

Figure 9A:
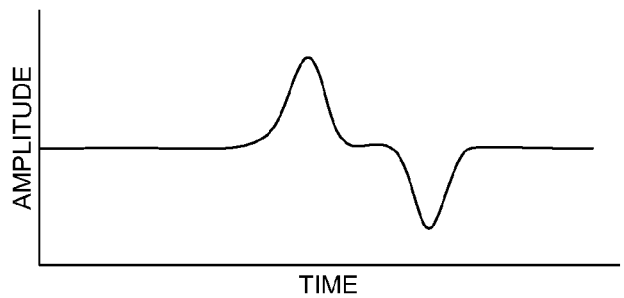
FIG. 9A shows an embodiment wherein the sensor signal comprises two pulses due to deflecting the load beam and then releasing the load beam.
Figure 9B:
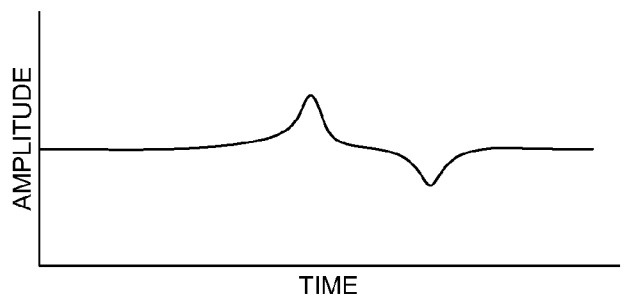
FIG. 9B shows an example sensor signal generated by a defective microactuator.

FIG. 9B shows an example sensor signal generated by a defective microactuator, wherein the first and second pulses deviate from the nominal sensor signal (e.g., FIG. 9A). The sensor signal of FIG. 9B may be visually evaluated by an operator of the microactuator test system, for example, by viewing the sensor signal on a monitor relative to a nominal sensor signal to determine that the microactuator is defective. Alternatively, the sensor signal of FIG. 9B may be evaluated by a signal processor relative to a nominal sensor signal in order to determine that the microactuator is defective.

Figure 10:
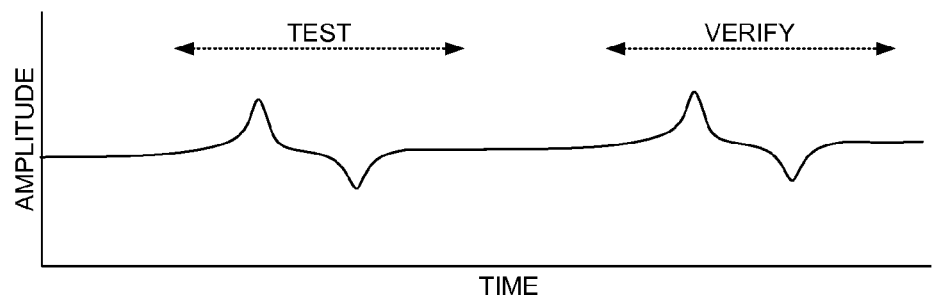
FIG. 10 shows an embodiment wherein when the sensor signal indicates a microactuator is defective, the microactuator is re-tested to verify the defect.

FIG. 10 illustrates an embodiment of the present invention wherein the process of testing a microactuator may comprise a test phase wherein the spreader pin deflects the load beam (e.g., up then down). When the sensor signal indicates the microactuator may be defective, a verification phase may be executed by again deflecting the load beam with the spreader pin (e.g., up then down). Accordingly, the sensor signal generated when testing a microactuator may comprise up to four pulses as shown in FIG. 10, wherein the first two pulses are generated during the test phase and the second two pulses are generated during the verification phase.

Deflecting the load beam with a spreader pin using a controlled velocity results in a low frequency sensor signal that may be evaluated visually by an operator to determine whether a microactuator is defective. Alternatively, a low speed, low cost signal processor may be employed to sample and evaluate the low frequency sensor signal to determine whether the microactuator is defective. In addition, using one or more spreader pins enables testing of a multiple actuator arm assembly (e.g., FIG. 1C) by moving respective spreader pins to engage the respective load beams, or by positioning a spreader pin relative to a target load beam that is to be deflected.

The control circuitry 10 in the microactuator test assembly (FIG. 1A) may comprise any suitable circuitry, such as one or more integrated circuits. In one embodiment, the control circuitry 10 comprises a microprocessor executing code segments of a control program for implementing the above described flow diagrams. Alternatively, or in addition to the microprocessor, the control circuitry 10 may comprise state machine circuitry implemented in an application specific integrated circuit.

What is claimed is:

1. An actuator test system for testing an actuator mounted at a joint coupling a base end of a load beam to a distal end of an actuator arm, the actuator test system comprising:
    a spreader pin operable to deflect the load beam by moving from a first position to a second position; and
    control circuitry comprising a signal detector for measuring a sensor signal generated by the actuator while deflecting the load beam with the spreader pin.

2. The actuator test system as recited in claim 1, wherein:
    the spreader pin comprises a tapered surface at a distal end;
    the load beam engages the tapered surface of the spreader pin;
    the first position corresponds to when the load beam first engages the tapered surface; and
    the second position corresponds to the load beam sliding along the spreader pin a predetermined distance.

3. The actuator test system as recited in claim 2, wherein the tapered surface comprises a tapered point.

4. The actuator test system as recited in claim 1, wherein:
    the spread pin rotates about an axis;
    the first position is a first angle of rotation; and
    the second position is a second angle of rotation.

5. The actuator test system as recited in claim 4, wherein the spreader pin comprises a D-shape.

6. The actuator test system as recited in claim 1, wherein:
    the first position is toward a base end of the load beam; and
    the second position is toward a distal end of the load beam.

7. The actuator test system as recited in claim 1, wherein the spreader pin is moved manually by an operator of the microactuator test assembly.

8. The actuator test system as recited in claim 1, further comprising a monitor operable to display the sensor signal.

9. The actuator test system as recited in claim 1, further comprising a pin actuator operable to move the spreader pin from the first position to the second position.

10. The actuator test system as recited in claim 1, wherein the control circuitry comprises a signal processor operable to evaluate the sensor signal to determine whether the microactuator is defective.

11. The actuator test system as recited in claim 1, further comprising a pin actuator operable to move the spreader pin into the first position.

12. The actuator test system as recited in claim 1, wherein the sensor signal comprises a single pulse.

13. The actuator test system as recited in claim 1, wherein the sensor signal comprises up to two pulses.

14. The actuator test system as recited in claim 1, wherein the sensor signal comprises up to four pulses.

15. A method of operating an actuator test system for testing an actuator mounted at a joint coupling a base end of a load beam to a distal end of an actuator arm, the method comprising:
    deflecting the load beam by moving a spreader pin from a first position to a second position; and
    measuring a sensor signal generated by the actuator while deflecting the load beam with the spreader pin.

16. The method as recited in claim 15, wherein:
    the spreader pin comprises a tapered surface at a distal end;
    the load beam engages the tapered surface of the spreader pin;
    the first position corresponds to when the load beam first engages the tapered surface; and
    the second position corresponds to the load beam sliding along the spreader pin a predetermined distance.

17. The method as recited in claim 16, wherein the tapered surface comprises a tapered point.

18. The method as recited in claim 15, wherein:
    the spread pin rotates about an axis;
    the first position is a first angle of rotation; and
    the second position is a second angle of rotation.

19. The method as recited in claim 18, wherein the spreader pin comprises a D-shape.

20. The method as recited in claim 15, wherein:
    the first position is toward a base end of the load beam; and
    the second position is toward a distal end of the load beam.

21. The method as recited in claim 15, further comprising moving the spreader pin manually.

22. The method as recited in claim 15, further comprising displaying the sensor signal on a monitor.

23. The method as recited in claim 15, further comprising moving the spreader pin from the first position to the second position using a pin actuator.

24. The method as recited in claim 15, further comprising evaluating the sensor signal with a signal processor to determine whether the microactuator is defective.

25. The method as recited in claim 15, further comprising moving the spreader pin into the first position using a pin actuator.

26. The method as recited in claim 15, wherein the sensor signal comprises a single pulse.

27. The method as recited in claim 15, wherein the sensor signal comprises up to two pulses.

28. The method as recited in claim 15, wherein the sensor signal comprises up to four pulses.

* * * * *